3,080,420
PURIFICATION OF PHTHALIC ACIDS
Eugene L. Ringwald, Decatur, Ala., assignor, by mesne assignments, to Monsanto Chemical Company, a corporation of Delaware
No Drawing. Filed Nov. 18, 1958, Ser. No. 774,609
11 Claims. (Cl. 260—524)

This invention relates to a method of preparing pure phthalic acids from impure mixtures as obtained by the oxidation of xylenes. More particularly, the invention relates to a method of separating pure phthalic acids from impure mixtures as obtained by the sulfur-ammonia oxidation process of xylenes.

It is known that para-xylene and meta-xylene can be converted to terephthalic acid and isophthalic acid, respectively, by oxidizing such xylenes with water, ammonium sulfate, and an inorganic sulfur compound containing sulfur at a valence below plus 6 according to a method that involves heating a mixture of these materials to an elevated temperature and under a pressure sufficient to maintain a part of the water in liquid phase. The resulting product comprising phthalic acid amides and ammonium salts is then hydrolyzed to liberate terephthalic acid or isophthalic acid therefrom as the case may be. The inorganic sulfur compound is preferably a water-soluble sulfide such as hydrogen sulfide, ammonium sulfide, or ammonium polysulfide. However, elemental sulfur, sulfur dioxide, water-soluble sulfites, water-soluble thiosulfates, and the like may be employed in the reaction as the sulfur material containing sulfur at a valence below plus 6.

Terephthalic acid is used today in large quantities as an intermediate in the preparation of synthetic linear polyethylene terephthalate having film- and fiber-forming properties with isophthalic acid being used as a fiber intermediate to a much lesser extent. Contrary to what may seem to be the most attractive method for producing polyethylene terephthalate, viz., simply reacting terephthalic acid with ethylene glycol, the process for virtually all commercial production of such polymer involves first forming the dimethyl ester derivative of terephthalic acid and carrying out an ester-interchange reaction between this derivative and ethylene glycol to form bis($\beta$-hydroxyethyl) terephthalate monomers or lowly polymerized polymers thereof which are polymerized to polyethylene terephthalate of suitable molecular weight. This commercial process is used because of the lack of rapidity of reaction between terephthalic acid and ethylene glycol as compared with the reaction between dimethyl terephthalate and ethylene glycol. A concomitant reason for the employment of dimethyl terephthalate is that dimethyl terephthalate can be conveniently subjected to conventional purification techniques whereas terephthalic acid can not.

However, recently a method of directly reacting terephthalic acid of high purity and ethylene glycol under controlled conditions to produce polyethylene terephthalate having excellent film- and fiber-forming properties at a rapid rate was learned. Such method is described in copending application Serial No. 774,608, now abandoned, filed simultaneously herewith.

It was found that commercially obtained terephthalic acid manufactured by the above-discussed sulfur-ammonia process and purified by known methods unfortunately does not possess the necessary degree of purity for use in the process of the aforesaid copending application. When the commercial acid was reacted with ethylene glycol in accordance with the copending application, the polyethylene terephthalate obtained had a dark color and a substantially reduced melting point with the degree of crystallinity of the polymer being unsatisfactorily low as compared with the crystallinity of the polyethylene terephthalate produced via the ordinary ester-interchange method. The reduced melting point and reduced crystallinity are attributed to the formation of polyglycol ether esters therein, which, even in small amounts, adversely affect these important properties. While it is not entirely clear why such formation occurs, one explanation is that the presence of certain acidic or acid-forming impurities indigenous in the sulfur-ammonia process, such as ammonium sulfate, or similar impurities extraneously introduced by purification techniques, catalyzes the production of the polyglycol ether esters. Even though the terephthalic acid amides and ammonium salts obtained by the sulfur-ammonia process are subjected to a color adsorbent, such as activated charcoal, prior to being hydrolyzed to terephthalic acid, it is found that the degree of purity of the isolated terephthalic acid necessary for directly reacting the terephthalic acid and ethylene glycol is not obtained.

Therefore, it is a general object of the present invention to provide a method of preparing pure phthalic acids obtained by the oxidation of xylenes. It is a further object of the present invention to provide a method of purifying terephthalic acid obtained by the sulfur-ammonia oxidation process of para-xylene. It is another object of the present invention to provide a method of purifying terephthalic acid obtained by the sulfur-ammonia oxidation process of para-xylene in such a manner that the acid may be used to react directly with ethylene glycol in the production of linear polyesters. Other objects and advantages of the present invention will be apparent from the detailed description herein.

In accordance with the present invention, crude terephthalic acid or crude isophthalic acid prepared by the oxidation of the appropriate xylene is brought into intimate contact with an aqueous solution of ammonium hydroxide to dissolve the terephthalic acid or isophthalic acid therein in the form of its ammonium salt. The resulting aqueous solution containing the ammonium salt is contacted for an appropriate period of time with activated carbon. Following this step, the ammonium solution is added to a solution of an acid having an ionization constant greater than that of terephthalic acid or isophthalic acid to regenerate and precipitate the acid. The precipitated acid is then separated, after which it is thoroughly washed and dried. The thus-purified terephthalic acid is particularly suitable for preparing polyethylene terephthalate by reacting same directly with ethylene glycol and is substantially free of ionizable acidic and acid-forming impurities that may otherwise catalyze the formation of polyglycol ether esters when it is reacted with ethylene glycol.

It is quite unexpected that the terephthalic acid treated according to this invention could be used to make a satisfactory polyethylene terephthalate by a direct reaction between the acid and ethylene glycol in view of the fact that when the acid is regenerated under commonly used conditions of adding a precipitating acid to the aqueous solution of the ammonium terephthalate, the required degree of purity can not be obtained conveniently. Therefore, it is seen that it is highly important to the proper practice of this invention that in the regeneration step the solution containing the ammonium salt be added to an acid rather than the precipitating acid be added to the ammonium salt solution, otherwise the improved result in regard to the production of polyethylene terephthalate is not readily attained.

Based on the foregoing discovery, it is thought that when the acid is regenerated by adding the precipitating acid to the solution containing the ammonium terephthalate, the ionizable acidic and acid-forming impurities become occluded in the terephthalic acid to such an extent that they can not be subsequently removed effectively therefrom.

As indicated above, the process of the present invention is particularly adapted for purifying terephthalate acid or isophthalic acid that has been produced by heating the appropriate xylenes with water, ammonium sulfate, and an inorganic sulfur compound containing sulfur at a valence below plus 6 at an elevated temperature to produce a reaction product comprised of phthalic acid amides and ammonium salts and converting these materials to terephthalic acid or isophthalic acid.

In the practice of the present invention the crude terephthalic acid or the crude isophthalic acid is dissolved in an aqueous solution of ammonium hydroxide, the amount of the hydroxide being substantially stoichiometrically equivalent to or preferably more than the amount of terephthalic acid or isophthalic acid to be dissolved. It will be appreciated that the time required in the dissolving step is dependent upon obvious process variables such as temperature, concentration of these substances, and the like.

After the terephthalic acid or isophthalic acid is dissolved in the ammonium hydroxide solution, it may be desirable to filter the resulting solution in order to separate any insoluble bodies therefrom, although this operation may not always be necessary. This solution containing the ammonium salt of terephthalic acid or isophthalic acid ordinarily has a dark yellow color and is treated with a high grade activated carbon that adsorbs the colored bodies and other impurities from the solution. The treatment operation may be accomplished in a variety of ways. For example, the solution may be permitted to flow in a continuous fashion by gravity or forced through a column or like device containing the activated carbon. The contact between the solution and the carbon is maintained until at least the discoloration of the solution that is ordinarily present is substantially eliminated. Alternatively, activated carbon, preferably in powdered form, may be added to the solution with the mixture being stirred for a sufficient time. Again, the time necessary to accomplish this depends on many obvious process conditions, namely the temperature, the specific type of carbon, etc.

The solution which has had the colored bodies removed therefrom and containing the ammonium salt of terephthalic acid or isophthalic acid is separated from the activated carbon by conventional processes, for example, by filtration, centrifugation, and the like.

The terephthalic acid or isophthalic acid is regenerated from the solution with an acid that is a stronger acid than these acids. As pointed out above, this is accomplished at a practical temperature by adding the purified ammonium salt solution to an acid rather than by adding an acid to the solution. It will be appreciated that the amount of acid required is preferably at least a stoichiometric quantity. In addition to the acids used below in the examples, any acid that has an ionization constant greater than that of terephthalic acid or isophthalic acid may be suitable. Thereafter, the terephthalic acid or isophthalic acid is separated at a convenient temperature by filtration or like conventional operations and washed thoroughly with water, preferably hot water above 60° C. and perhaps exceeding the boiling point of the water when superatmospheric pressures are employed. The thus-treated terephthalic acid or isophthalic acid is dried, for example by placing same in a heated oven or by the use of other conventional techniques.

Further details of the practice of the invention are set forth in the following examples that show the improvement herein and the contrasting results obtained when terephthalic acid produced by the sulfur-ammonia process is purified in and not in accordance with the present invention. All percentages are percentages by weight unless otherwise designated.

*Example I*

A solution was prepared by mixing and by stirring the following: 1206 gms. of commercially produced terephthalic acid (prepared by the aforesaid sulfur-ammonia process), 970 gms. of 28 percent ammonium hydroxide, and 13 liters of water. After the terephthalic acid was dissolved in the form of ammonium terephthalate, the solution was filtered and then slowly passed through a column containing activated carbon during a period of 12 hours. The carbon was purchased under the name of Pittsburg Carbon (type OL). The solution before being contacted with the carbon was yellow colored but was colorless after the treatment with the carbon. An aqueous solution containing 10 percent sulfuric acid in an amount of 7850 gms. was added to the decolorized solution of ammonium terephthalate to form a precipitate composed of terephthalic acid. Then the precipitated terephthalic acid was filtered, washed thoroughly with hot water at a temperature of almost 100° C., and air dried in a circulating oven.

A slurry consisting of 66.4 gms. of this purified terephthalic acid and 248 gms. of ethylene glycol was heated in a stainless steel autoclave at a temperature of 221 to 231° C. and under a gauge pressure of 25 to 27 pounds per square inch for 20 minutes in an atmosphere of nitrogen gas. During the reaction induced between the acid and glycol, 165 mls. of distillate was collected. The resulting mixture was transferred to a glass polymerization vessel with 60 mgs. of zinc acetylacetonate being added as a polymerization catalyst. While the mixture was being stirred at 285° C., excess glycol was distilled off. Thereafter, the reaction mixture was subjected to a reduced pressure of less than 0.3 mm. of mercury at the same temperature for seventy minutes. The polymerizing mixture rapidly darkened in color and then became black. The resulting polymer was a glass-like substance melting below 200° C. and was unsuitable for the formation of strong fibers. This example shows that when terephthalic acid is regenerated from the ammonium terephthalate not in accordance with the present invention, it reacts with ethylene glycol under the specified conditions to produce a resulting polymer having a poor color and low melting point.

*Example II*

A solution was prepared by mixing and by stirring the following: 1206 gms. of commercially produced terephthalic acid (prepared by the sulfur-ammonia process), 970 gms. of 28 percent ammonium hydroxide, and 13 liters of water. After the terephthalic acid dissolved in the form of ammonium terephthalate, the solution was filtered and then passed through a column containing activated carbon as above in Example I. The ammonium salt solution was added slowly with stirring to 7850 gms. of an aqueous 10 percent sulfuric acid solution to precipitate terephthalic acid. The precipitated acid was filtered, washed thoroughly with hot water at a temperature near the boiling point of water, and air dried in a circulating oven.

A slurry which consisted of 66.4 gms. of the thus-purified terephthalic acid and 248 gms. of ethylene glycol was added to a stainless steel autoclave in which a temperature of 220 to 235° C. and a pressure of 25 to 40 p.s.i.g. was maintained for 40 minutes. A total of 37 mls. of distillate composed primarily of water was collected during this reaction which was conducted under an atmosphere of nitrogen. Next, the reaction mixture was transferred to a glass polymerization vessel with 60 mgs. of zinc acetylacetonate being added as a catalyst. While the mixture was being stirred at 285° C., excess glycol was distilled off. Thereafter, the reaction mixture was subjected to a reduced pressure of less than 0.3 mm. of mercury at the same temperature for seventy minutes. The resulting polymer after cooling was an opaque and white substance melting at 255–257° C. Strong, cold-drawable fibers could be melt spun from the polymer.

*Example III*

The procedure of Example I was duplicated except that the terephthalic acid was regenerated by the addition of slightly more than the stoichiometric amount of hydrochloric acid to the ammonium salt solution. The hydrochloric acid was prepared by diluting 530 mls. of concentrated hydrochloric acid to 1500 mls. with distilled water. The ultimate polymer prepared from this terephthalic acid and ethylene glycol in accordance with the polymerization method outlined above in Example I was poor in color and melted around 215° C. Fiber-forming properties of the polymer were also poor.

*Example IV*

The procedure of Example II was duplicated except that the terephthalic acid was regenerated by the addition of the ammonium salt solution to a solution containing slightly more than the stoichiometric amount of acid prepared by diluting 530 mls. of concentrated hydrochloric acid to 1500 mls. with distilled water. The ultimate polymer prepared from this terephthalic acid and ethylene glycol in accordance with the polymerization method outlined above in Example I was white in color and melted at 257–258° C. Fiber-forming properties of the polymer were excellent.

*Example V*

A solution was prepared by mixing and stirring the following: 420 gms. of commercially produced terephthalic acid (prepared by the sulfur-ammonia process), 336 gms. of 28 percent ammonium hydroxide, and 9.5 liters of water. After the terephthalic acid dissolved in the form of ammonium terephthalate, the resulting solution was filtered and then pumped through a column containing activated carbon as above in Example I. The decolorized solution was added slowly with stirring to 640 gms. of an aqueous 25 percent sulfuric acid solution to precipitate the purified terephthalic acid. The precipitated terephthalic acid was filtered, washed thoroughly with hot water, and air dried in a circulating oven.

A slurry of 158.4 gms. of the thus-purified terephthalic acid and 530 mls. of ethylene glycol was heated under nitrogen gas at a temperature of 220 to 231° C. for 20 minutes in an autoclave and at a pressure of 25 p.s.i.g. During this time a total of 210 mls. of distillate was collected. The thus-produced reaction mixture was transferred from the autoclave to a glass reactor provided with stirring means. As the polymerization catalyst, 60 mgs. of zinc acetylacetonate was then added to the reactor. The excess glycol was distilled off and the resulting mixture was heated while being stirred at a temperature of 285° C. and under a pressure of less than 0.3 mm. of mercury for seventy minutes to complete the condensation reaction between the terephthalic acid and ethylene glycol. Upon being cooled, the polymer so produced was opaque and highly crystalline and had an excellent white color and a melting point of 255–257° C.

*Example VI*

A solution was prepared by mixing and stirring the following: 420 gms. of commercially obtained terephthalic acid (prepared by the sulfur-ammonia process), 336 gms. of 28 percent ammonium hydroxide, and 9.5 liters of water. After the terephthalic acid dissolved in the form of ammonium terephthalate, the resulting solution was filtered and then pumped through a column containing activated carbon as above in Example I. The decolorized solution was added slowly with stirring to a solution containing acetic acid in excess of the amount necessary to convert the ammonium terephthalate to terephthalic acid which thereupon precipitated. The precipitated terephthalic acid was filtered, washed thoroughly with hot water, and air dried in a circulating oven.

A slurry prepared from 154 gms. of this purified terephthalic acid and 530 mls. of ethylene glycol was heated under nitrogen gas in an Inconel reactor at 240° C. and at a pressure of 27 to 28 p.s.i.g. for 20 minutes. During this time a total of 170 mls. of aqueous distillate was collected. As a polymerization catalyst, 90 mgs. of zinc acetylacetonate was then added to the reactor. The excess glycol was distilled off and the resulting mixture was heated while being stirred at a temperature of 285° C. and under a pressure of less than 0.3 mm. of mercury for seventy minutes to complete the condensation reaction between the terephthalic acid and the ethylene glycol. Upon being cooled, the polymer melt rapidly set to a white, opaque solid. A sample of the polymer melted at 255–256° C.

*Example VII*

The procedure of Example VI was repeated except that the terephthalic acid was regenerated by the addition of the ammonium salt solution to a solution containing the amount of sulfurous acid necessary to regenerate the terephthalic acid. The ultimate polymer prepared from this terephthalic acid and ethylene glycol in accordance with the polymerization method outlined above in Example I was white in color and melted at 250° C. Fiber-forming properties of the polymer were excellent.

*Example VIII*

A solution was prepared by mixing and stirring the following: 1206 gms. of commercially produced isophthalic acid (prepared by the aforesaid sulfur-ammonia process), 970 gms. of 28 percent ammonium hydroxide, and 13 liters of water. After the isophthalic acid was dissolved in the form of its ammonium salt, the solution was filtered and then slowly passed through a column containing activated carbon as above in Example I. The ammonium salt solution was added slowly with stirring to 7850 gms. of an aqueous 10 percent sulfuric acid solution to precipitate isophthalic acid. The precipitated acid was filtered, washed thoroughly with hot water at a temperature near the boiling point of water, and air dried in a circulating oven. It was found that the isophthalic acid treated in accordance with this example was extraordinarily white and had an exceptionally high degree of purity.

The present invention affords a convenient and expedient method of substantially complete purification of commercial terephthalic acid or isophthalic acid obtained by the sulfur-ammonia oxidation process of the appropriate xylene. Terephthalic acid treated in accordance with the present invention is eminently suitable for preparing polyethylene terephthalate by condensing the acid directly with ethylene glycol under controlled conditions. The polyethylene terephthalate may be formed into fibers, filaments, films, and like shaped objects that have desirable properties. Numerous other advantages will be apparent to those skilled in the art.

While the present invention has been described with respect to certain of its specific embodiments, it is to be understood that this is merely intended in an illustrative sense and that changes and variations may be made without departing from the spirit and scope of the invention as defined in the appended claims.

What is claimed is:

1. A process for removing color-forming contaminants from crude phthalic acid selected from the group consisting of terephthalic acid and isophthalic acid as obtained by oxidizing a member selected from the group consisting of para-xylene and meta-xylene with water, ammonium sulfate and an inorganic sulfur compound containing sulfur at a valence below 6 at elevated temperatures and pressures, which comprises the steps of forming the ammonium salt of the said acid by intimately mixing said crude phthalic acid with an aqueous solution of ammonium hydroxide, contacting the resulting solution with activated carbon, effecting a separation of said solution from said activated carbon, thereafter slowly adding the separated solution to at least a stoichiometric amount of a second acid having an ionization constant greater than that of said phthalic acid thereby to produce phthalic acid as a precipitate, separating the precipitated phthalic acid, and then washing the phthalic acid.

2. The process of claim 1 wherein the said second acid is hydrochloric acid.

3. The process of claim 1 wherein the said second acid is sulfuric acid.

4. The process of claim 1 wherein the said second acid is acetic acid.

5. The process of claim 1 wherein the said second acid is sulfurous acid.

6. A process for removing color-forming contaminants from crude terephthalic acid as obtained by oxidizing paraxylene with water, ammonium sulfate and an inorganic sulfur compound containing sulfur at a valence below 6 at elevated temperatures and pressures, which comprises the steps of dissolving said crude terephthalic acid in an aqueous solution of ammonium hydroxide to form ammonium terephthalate, contacting the resulting solution with activated carbon for a sufficient time such that the solution is substantially decolorized, effecting a separation of said solution from said activated carbon, thereafter slowly adding the separated solution to at least a stoichiometric amount of a second acid having an ionization constant greater than that of said terephthalic acid, thereby to produce terephthalic acid as a precipitate, separating the precipitated terephthalic acid, and then washing the terephthalic acid with hot water.

7. A process according to claim 6 wherein said second acid is hydrochloric acid.

8. A process according to claim 6 wherein said second acid is sulfuric acid.

9. A process according to claim 6 wherein said second acid is acetic acid.

10. A process according to claim 6 wherein said second acid is sulfurous acid.

11. A process for removing color-forming contaminants from crude terephthalic acid as obtained by oxidizing paraxylene with water, ammonium sulfate and an inorganic sulfur compound containing sulfur at a valence below 6 at elevated temperatures and pressures, which comprises the steps of forming the ammonium terephthalate by intimately mixing said crude terephthalic acid with an aqueous solution of ammonium hydroxide, contacting the resulting solution with activated carbon for a sufficient time such that the solution is substantially decolorized, effecting a separation of said solution from said activated carbon, thereafter slowly adding the separated solution to at least a stoichiometric amount of a second acid having an ionization constant greater than that of terephthalic acid, to form a precipitate of terephthalic acid, separating the precipitated terephthalic acid, then washing the terephthalic acid with hot water, and drying the washed terephthalic acid.

References Cited in the file of this patent

UNITED STATES PATENTS

| | | |
|---|---|---|
| 2,734,079 | Aroyan et al. | Feb. 7, 1956 |

FOREIGN PATENTS

| | | |
|---|---|---|
| 786,897 | Great Britain | Nov. 27, 1957 |
| 788,276 | Great Britain | Dec. 23, 1957 |